United States Patent [19]
Henderson et al.

[11] 3,842,306
[45] Oct. 15, 1974

[54] ALUMINA COATINGS FOR AN ELECTRIC LAMP

[75] Inventors: David C. Henderson, Chagrin Falls; Kenneth M. Maloney, Shaker Heights, both of Ohio

[73] Assignee: General Electric Company, Schenectady, N.Y.

[22] Filed: June 21, 1973

[21] Appl. No.: 372,069

[52] U.S. Cl. ...................... 313/116, 117/31, 117/97
[51] Int. Cl. ........................................... H01k 1/32
[58] Field of Search ................. 313/116; 117/31, 97

[56] References Cited
UNITED STATES PATENTS

| | | | |
|---|---|---|---|
| 2,960,414 | 11/1960 | Gustin et al. | 117/97 X |
| 3,013,892 | 12/1961 | Songas | 117/31 X |
| 3,209,192 | 9/1965 | Decker | 313/116 |

*Primary Examiner*—Alfred L. Brody
*Attorney, Agent, or Firm*—John F. McDevitt; Lawrence R. Kempton; Frank L. Neuhauser

[57] ABSTRACT

A light diffusion coating for an electric lamp is described which comprises a thin layer of spherical alumina particles that have been vapor-deposited in a certain particle size range to provide more effective light scattering. The coatings are deposited upon the interior surface of the sealed glass envelope and have been found especially useful for incandescent lamps as well as for such other lamps as electric discharge lamps.

11 Claims, 4 Drawing Figures

ALUMINA COATINGS FOR AN ELECTRIC LAMP

BACKGROUND OF THE INVENTION

While a variety of materials and methods have apparently been used to provide a light-diffusion layer upon the surface of the glass envelope employed in electric lamps, the predominant technique has been a deposit of fine-size silica coatings upon the glass substrate which has been etched prior to coating. The light scattering effect produced with a low bulk density silica coating applied upon the interior surface of the bulb wall in incandescent lamps is described in U.S. Pat. No. 2,922,065 to Meister et al., which also mentions various methods of applying this general type of coating. Less effective light-scattering materials which are also mentioned in this patent are alkaline-earth and manganesium titanates, oxides, alumina, titania, and zirconium silicate. Of the 150 different finely-divided light-scattering materials said to have been experimentally investigated, none were found as efficient as the low bulk density silica. The problems still encountered with low bulk density silica coatings, however, are reported in a later U.S. Pat. No. 2,963,611 which issued to one of the same inventors and these problems were said to be ameliorated by either adding a material having a true density of at least about 4 grams/cm$^3$ to the silica or by precoating the glass substrate with this more dense material prior to deposition of the silica coating. While the improvements thereby attained are said not to reduce the light-scattering properties of the overall light-diffusion medium, it will be apparent that such additional means increases the cost and difficulties of achieving the final result. Consequently, improved coatings having more effective light-scattering properties and which can be applied more simply are still being sought.

SUMMARY OF THE INVENTION

It has been discovered by the applicants, surprisingly, that a particular form of alumina particles can be deposited directly upon the untreated internal surface of a lamp glass envelope in a manner not requiring additional processing steps to provide extremely efficient light-scattering of the visible illumination incident thereon from both incandescent and gas-discharges light sources. More particularly, the alumina coatings of the present invention have been found to scatter at least 99 percent or more of the emitted visible radiation from such light sources and with less light loss compared with the silica coatings now being used. The optical diffusion characteristics of the present coatings are further distinctive compared with the known silica coatings in several other respects including a more uniform light output distribution with respect to the profile of the lamp, a greater reduction in maximum brightness of light output than is obtained with silica fume deposition on a clear-bulb, and more back-scattering of the light from the illumination source. As exemplary of the novel light-diffusion characteristics for the spherical alumina deposits a coating weight of 35 mg on the interior bulb wall of a 100-watt incandescent lamp scatters 99 percent of the incident visible light but does not completely hide the burning filament, whereas a 65 mg coating for the same lamp scatters 99.9 percent of the incident visible light and completely hides the filament.

Generally, the present coatings comprise a thin layer of spherical crystalline alumina particles which have been vapor-formed in a particle size distribution between about 400–5,000 Angstroms diameter with an average particle size of about 1,350 Angstroms diameter when deposited directly upon the untreated internal surface of the lamp glass envelope. At a light scattering level of approximately 99 percent of the incident visible light, no more than about 2–3 percent of the visible light is lost, whereas up to about 8 percent visible light loss takes place at the 99.9 percent light scattering level of coatings having sufficient thickness to hide the filament of an incandescent lamp. When such coatings further contain a minor proportion up to approximately 30 weight percent of said coating of larger size non-spherical alumina particle agglomerates obtained by codepositing preformed alumina particulates with the vapor-formed spherical alumina particles there is improvement obtained in hiding the filament of an incandescent lamp at a lower film thickness. The spherical alumina particles are obtained in situ by combustion of selected aluminum organic compounds in an oxidizing atmosphere utilizing the general method outlined in U.S. Pat. No. 2,545,896 to Pipkin. The vapor-formation of spherical alumina particles can also be accomplished as a preliminary step in conventional lamp manufacture at high speeds with the light diffusion film being deposited without adding further steps or other interruption to the manufacturing pocess.

Useful aluminum organic compounds in the practice of the present invention can be either liquids or solids having boiling or sublimation temperatures below the combustion temperatures. Such materials include two classes of chemical compounds; namely, the aluminum alkyls and the aluminum alkoxides wherein all the carbon atoms are saturated, hence will burn cleanly with a minimum of oxygen and no external heat being needed. Unsaturated aluminum organic compounds have a tendecny to produce a dirty flame and require more oxygen along with another flammable compound in order to completely burn the carbon produced upon combustion. While the alkyl compounds of aluminum such as trimethyl aluminum or triethyl aluminum are commercially available there would be a serious disadvantage to their use in practicing the present invention since these materials are pyrophoric and burn spontaneously in air thereby requiring special precautions for their use and handling. On the other hand, the more desirable aluminum alkoxide compounds have the advantage of being relatively stable in dry air or oxygen and ignite only at relatively high temperatures or when placed in direct contact with a flame. In air, these compounds burn quite slowly, but in pure oxygen a rapid burning rate is obtained to form anhydrous aluminum oxide. While the proportion of aluminum oxide thereby obtained is dependent upon the organic group, the preferred alkoxides can illustratively contain short-chain alkyl groups including n-propyl, sec-propyl; n-, sec-, and t-butyl; n-, sec-, and t-amyl; along with such higher order groups as hexyl and heptyl. The especially preferred aluminum alkoxide compound is aluminum isopropoxide by reason of its commercial availability at relatively modest cost.

As was previously indicated, the use of a flame deposition process to provide a light-diffusion silica coating on the interior surface of an incandescent lamp envelope is already well-known. The advantages of a flame deposition process are also known and include the use of automated equipment, elimination of end brushing after coating, and no lehring if the coating adheres well to the glass substrate and exhibits the desired optical diffusion characteristics upon deposition. In the known general method, it should be noted that an inside frost is generally provided before deposition of the silica coating in order to enhance the diffusion of the composite layer and steam treatments have also been proposed after deposition of the silica coating for the same reason. In the modification of this general method to practice the present invention, an aluminum oxide coating is deposited directly upon the untreated internal surface of the lamp glass envelope by combustion of selected aluminum organic compounds in a moving oxidizing gas stream. More particularly, in the preferred process, rapid combustion of a solid aluminum isopropoxide pellet is accomplished by igniting the pellet in a burner which surrounds the pellet with a moving oxygen stream while said burner is disposed inside the lamp glass envelope. This burner can also be modified to introduce a secondary oxidizing gas stream containing suspended preformed minute crystalline alumina particles for mixing with the vapor-formed spherical alumina particles in order to deposit a film having both type particles without significantly increasing the film thickness.

DESCRIPTION OF THE PREFERRED EMBODIMENTS

In one of its aspects, the present light diffusion coatings can be deposited directly upon the untreated internal surface of the lamp glass envelope prior to its assembly as an electric incandescent lamp. More particularly, a lamp of this type comprises a sealed glass envelope, a pair of lead-in wires sealed into said envelope and a tungsten filament coil in said envelope connected to said lead-in wires, with said lead-in wires being further electrically connected at the other end to a suitable lamp base. To deposit the coating on the interior of bulb wall prior to such lamp manufacture, a pellet of aluminum isopropoxide or other solid aluminum alkoxide compound is burned inside the bulb utilizing an amount of the starting material dependent upon the coating weight desired. For example, the pellet weights of aluminum isopropoxide which were employed to coat a 100-watt incandescent lamp bulb along with the coating weights obtained therein when the pellets were burned in an oxidizing atmosphere of dry oxygen are reported in Table I below along with the light output measurements obtained upon the final assembled lamps.

TABLE I

INITIAL LUMEN DATA FOR ALUMINA COATED LAMPS

| Lamp Description | Average Coating Weight | Average Watts | Average Lumens | Average LPW | Average % LPW * |
|---|---|---|---|---|---|
| 0.2gm pellet | 7.2mg | 76.08 | 1216 | 15.99 | 99.9 |
| 0.4gm pellet | 22.6mg | 76.00 | 1194 | 15.71 | 98.1 |
| 0.6gm pellet | 34.4mg | 75.88 | 1177 | 15.51 | 96.9 |
| 0.8gm pellet | 33.2mg | 75.96 | 1177 | 15.49 | 96.7 |
| Clear glass | | 75.96 | 1216 | 16.01 | |

* With respect to clear glass lamps.

The relationship shown in Table I between the pellet weight and the coating weight obtained should be considered illustrative only since it has been found that a lower oxygen flow rate at the bulb wall than used for these tests provides higher coating weights for a given pellet size. Said in another way, the burning time periods for the coating weights reported in Table I ranged from about 5–20 seconds, depending on the pellet weight and it has since been learned that a reduced oxygen flow rate can be used during the combustion process to extend the burning time and deposit heavier coatings. To further illustrate the influence of the oxygen flow rate upon the alumina coating weights obtained, it has been found that a 60–65 mg coating is produced with a 1.4 gram of aluminum isopropoxide during a burning time of around 22 seconds. The lamp performance data reported in Table I was obtained by conventional photometric measurement and illustrates the comparatively low level of light loss experienced with the present coatings compared with the same type lamp employing a clear glass envelope.

Figure 1:
FIG. 1 is a scanning electron micrograph taken at 10,000 times magnification of the spherical alumina particles making up the bulk of the present light-diffusion coating.

The shape and particle size distribution of the of the spherical alumina particles in the light-diffusion films prepared in the foregoing manner is illustrated in the photograph of FIG. 1. Such coatings consist of small spherical particles of alumina oxide which are randomly distributed on the inside surface of the bulb wall. To establish the particle size distribution, a particle count was made at three different optical magnifications and the size of the counted particles then determined by known means as hereinafter described. The results of these measurements are reported in Table II below:

TABLE II

PARTICLE SIZE DISTRIBUTIONS FOR Al₂O₃ SPHERICAL PARTICLES

| DIAMETER RANGE (ANGSTROMS) | RELATIVE FRACTION OF PARTICLES | | |
|---|---|---|---|
| | 1 | 2 | 3 |
| 150 – 450 | .0055 | .0337 | .0191 |
| 450 – 750 | .0550 | .1815 | .1042 |
| 750 – 1050 | .1621 | .1971 | .2643 |
| 1050 – 1350 | .2390 | .0961 | .2320 |
| 1350 – 1650 | .1841 | .1490 | .1175 |
| 1650 – 1950 | .1126 | .1418 | .1087 |
| 1950 – 2250 | .1044 | .1106 | .0617 |
| 2250 – 2250 | .0577 | .0481 | .0411 |
| 2550 – 2850 | .0302 | .0132 | .0206 |
| 2850 – 3150 | .0220 | .0096 | .0088 |
| 3450 – 3750 | .0028 | .0012 | .0000 |
| 3750 – 4050 | .0028 | .0024 | .0074 |
| 4050 – 4350 | .0028 | .0000 | .0044 |
| 4350 – 4650 | .0028 | .0012 | .0000 |
| 4650 – 4950 | .0055 | .0000 | .0015 |
| 4950 – 5250 | .0000 | .0000 | .0000 |
| 5250 – 5550 | .0000 | .0000 | .0000 |
| 5550 – 5850 | .0000 | .0000 | .0000 |
| 5850 – 6150 | .0000 | .0000 | .0000 |
| Totals | 1.0003 | 0.9999 | 1.0001 |
| No. of particles | 364 | 832 | 681 |
| Mean Average diam. | 1565. | 1366. | 1352. |
| Average Particle Volume | $3.474 \cdot 10^6$ nm³ | $2.453 \cdot 10^6$ nm³ | $2.433 \cdot 10^6$ nm³ |

Figure 2:
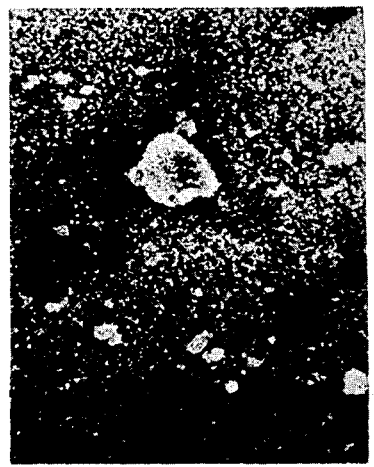
FIG. 2 is a scanning electron micrograph taken at 800 times magnification of the present coating which further contains agglomerates obtained by codepositing a different type alumina material with the vapor-formed spherical alumina particles.

In conducting the above measurements, it was noted that no significant difference was found in the particle size distributions obtained from different sections of the bulb wall. A digitizer that was accurate to 0.01 inch and a Zeitz particle size analyzer were both used to measure the particle sizes. By measuring all particles within the field of view of an electron micrograph, it was possible to avoid prejudicing the distribution towards larger size particles. The measurements reported in column 1 of Table II were obtained from a scanning electron micrograph taken at 32,000 times magnification. Column 2 in Table II represents a second distribution obtained from a transmission electron micrograph taken at 15,000 magnification. At this magnification, an error of 0.01 inch in the digitizer reading equals ± 15 percent for the smaller particle sizes. The distribution reported in column 3 of Table II is deemed more accurate than column 1 by reason of the absence of a 200 A thick gold coating on the particles. From these measurements, it can be seen that the particle size distribution for the present alumina coatings lies in the approximate range 400 A – 5,000 A with a mean average diameter of approximately 1,350 A. The FIG. 2 photograph represents a scanning electron micrograph taken at 800 times magnification of the composite coating obtained when the vapor-formed alumina particles are codeposited with an already preformed minute crystalline alumina material such as Alon C powder being admitted in the oxidizing atmosphere during the combustion process. It will be noted from FIG. 2 that larger agglomerates of the Alon C are thereby obtained which become interspersed in the matrix of spherical alumina particles and the presence of these aggregates, although a minor constituent in the coating, helps hide the filament.

Figure 3:
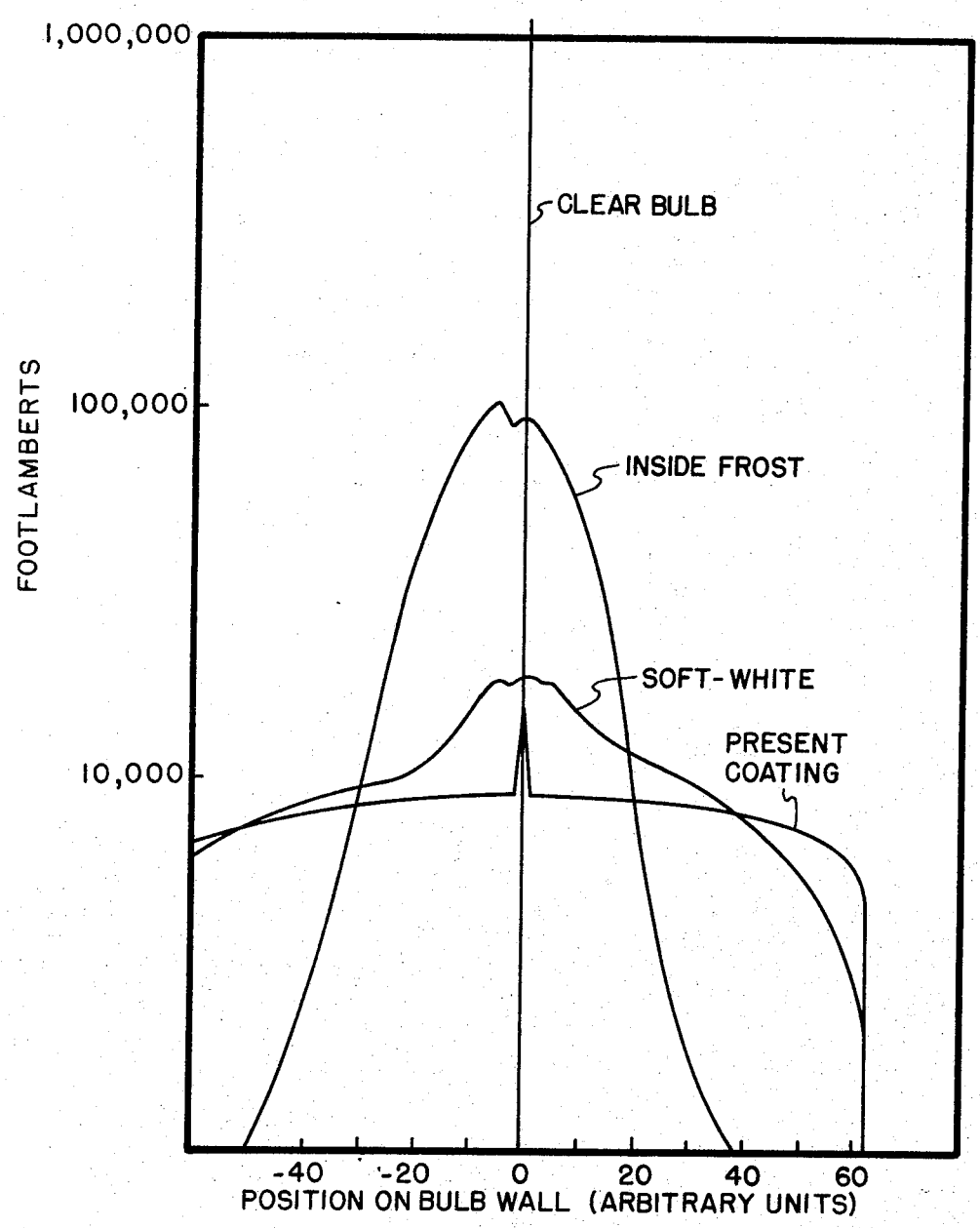
FIG. 3 is a graph of the lamp brightness measurements for various light-diffusion layers disposed on the interior bulb wall of an incandescent lamp and the variation obtained therein as a function of the angle through which the light from the burning filament is scattered.

Referring to FIG. 3, a plot is shown of the brightness or visible light output from various coated and uncoated 75-watt incandescent lamps as measured along the profile of the bulb wall. More particularly, the variation in the lamp brightness was measured with a telescopic light meter being focused on the bulb wall at a distance of approximately 34 inches. The distance was chosen so that a 6 minute viewing aperture of the light meter would focus on a spot equal in diameter to the filament coil width in order to measure the correct average brightness of the filament. As shown on the abscissa of said graph, the brightness was measured as a function of the angle in degrees through which the light from the filament was scattered. As further noted from the identifications appearing upon said graph, the comparison in brightness was made for a standard inside frost lamp, a "soft-white" lamp having a silica vapor coating deposited upon an inside frost substrate, a clear lamp, and a lamp having approximately 35 mg coating weight of the vapor-formed alumina coating deposited on a clear glass bulb. It can be noted from said graph that the average maximum brightness from the clear bulb was approximately 1,200,000 footlamberts in the form of a long narrow spike. The brightness measurements for the inside frosted lamp are characterized by highly non-uniform brightness over the bulb wall wherein the light incident from the filament on the inside etched glass surface is bent through small random angles by refraction. This type diffusion spreads the visible radiation over a small area of the bulb wall which appears as a bright glow and very little light is scattered through large angles. Hence, while the filament image will be obscured by such diffusion, there will still be wall shadows created when this lamp illuminates objects. The soft-white lamp provides additional light diffusion and the brightness is more uniform across the bulb wall profile. In contrast to all the foregoing results, however, the present coating on a clear glass bulb produces more nearly uniform brightness across the entire bulb profile so that only a small spike attributable to the incandescent filament of approximately 7,000–15,000 footlamberts remains. This spike represents less than 1 percent of the total visible light produced from the incandescent filament so that 99 percent or more of the filament visible light will be scattered uniformly.

Figure 4:
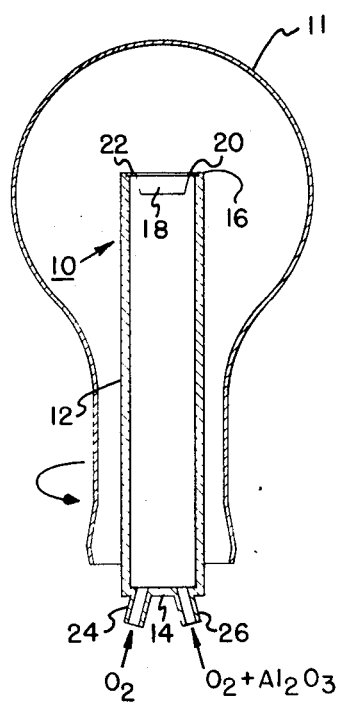
FIG. 4 is a diagrammatic cross-sectional view of the method in which the present coatings are deposited.

In FIG. 4 there is shown diagrammatically a cross-sectional view of one burner design which can be employed to deposit the present coatings. More particularly, a burner 10 is depicted having a size and contour selected for placement within the open end of the lamp glass envelope 11 which can be rotatably mounted thereover by conventional means not shown. Said burner can be constructed having a tubular body portion 12 with a closed end 14 and an open end 16 for emergence of the alumina vapor. Container means 18 for the solid aluminum organic compound is disposed adjacent the open end of the burner and can be secured thereat by conventional fastening means 20 and 22 to provide an annular space for discharge of the oxidizing atmosphere from the burner. A suitable opening 24 is provided at the closed end of the burner to admit an oxidizing atmosphere such as oxygen and which can further include supplemental entrance means 26 for the admission of preformed alumina particles which are suspended in a second moving stream of the same or a different oxidizing atmosphere such as air. Mixing of the two gas streams takes place within the burner so that a uniform dispersion of the suspended aluminum material takes place in the alumina vapor formed concurrently by combustion of the solid aluminum organic compound at the burner nozzle. In operation, the combustion process can be initiated by igniting the solid aluminum organic compound with conventional means and starting the flow of an oxidizing atmosphere through the burner. Such operation can be conducted automatically on high speed manufacturing equipment wherein the burner actuation is accomplished concurrently with lowering the lamp glass envelope with rotation over the burner. The combustion process generates sufficient heating of suspended material in the moving gas stream along with the glass substrate so that no additional heating is required to obtain an adherent coating on the bulb wall.

It will be apparent from the foregoing description that a generally useful improved alumina coating has been provided for electric lamps along with a method for obtaining coatings. It will be apparent that modifications can be made in said coatings along with the method for their preparation without departing from the true spirit and scope of this invention. For example, various dopants and other additives can be included in the coatings to provide different colors or decorative effects using the same general deposition process. Likewise, a preliminary thermal decomposition of longer chain aluminum organic compounds could render such raw materials useful in the present process. Consequently, it is intended to limit the present invention only by the scope of the appended claims.

What we claim as new and desire to secure by Letters Patent of the United States is:

1. A light diffusion coating for an electric lamp which comprises a thin layer of vapor-formed spherical alumina particles having an individual particle size range from approximately 400 A to 5,000 A in diameter, said layer scattering at least 99 percent of the incident visible radiation with minor lumen loss when deposited directly upon the clear internal surface of the lamp glass envelope.

2. A light diffusion coating as in claim 1 which further contains a minor proportion up to approximately 30 weight percent of said coating of larger size preformed alumina particle agglomerates obtained by co-depositing preformed solid alumina particles with the vapor-formed spherical alumina particles.

3. A light diffusion coating as in claim 2 wherein both spherical and preformed alumina particles are crystalline alumina.

4. A light diffusion coating for an electric lamp which comprises a thin composite layer of mixed alumina particles having a matrix of vapor-formed spherical particles in the individual particle size range from approximately 400 A to 5,000 A in diameter, said matrix having interspersed therein larger size preformed alumina particle agglomerates, and with said layer scattering at least 99 percent of the incident visible radiation with minor lumen loss when deposited directly upon the untreated internal surface of the lamp glass envelope.

5. A light diffusion coating as in claim 4 wherein both spherical and preformed alumina particles are crystalline alumina.

6. In an electric lamp comprising a sealed glass envelope, a pair of lead-in wires sealed into said envelope, and a resistance filament connected to said lead-in wires, the improvement which consists of a light diffusion coating deposited directly upon the clear internal surface of the lamp glass envelope, said coating comprising a thin layer of spherical alumina particles vapor-formed in the individual particle size range from approximately 400 A to 5,000 A in diameter with said layer scattering at least 99 percent of the incident visible radiation with minor lumen loss.

7. An electric lamp as in claim 6 wherein the resistance filament is a tungsten coil.

8. An electric lamp as in claim 6 wherein the light diffusion coating comprises a thin composite layer of mixed alumina particles having a matrix of vapor-formed spherical particles in the individual particle size range from approximately 400 A to 5,000 A in diameter, said matrix having interspersed therein larger size preformed alumina particle agglomerates.

9. An electric lamp as in claim 8 wherein both spherical and preformed alumina materials are crystalline alumina.

10. An electric lamp as in claim 8 wherein the visible light output of the lamp is relatively uniform with respect to the lamp profile.

11. An electric lamp as in claim 9 wherein the resistance filament is a tungsten coil.

* * * * *